(12) United States Patent
Ma et al.

(10) Patent No.: US 11,256,123 B1
(45) Date of Patent: Feb. 22, 2022

(54) DISPLAY PANEL AND TERMINAL DEVICE

(71) Applicant: JRD Communication (Shenzhen) LTD., Guangdong (CN)

(72) Inventors: Jitao Ma, Guangdong (CN); Panwei Xiong, Guangdong (CN); Ping Chen, Guangdong (CN); Yafang Xi, Guangdong (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 17/228,767

(22) Filed: Apr. 13, 2021

(30) Foreign Application Priority Data

Feb. 8, 2021 (CN) .......................... 202110182965.7

(51) Int. Cl.
  *G02F 1/1333* (2006.01)
  *G02F 1/1335* (2006.01)
(52) U.S. Cl.
  CPC .... *G02F 1/13338* (2013.01); *G02F 1/133514* (2013.01); *G02F 1/133524* (2013.01); *G02F 1/133528* (2013.01)

(58) Field of Classification Search
  CPC ........... G02F 1/13338; G02F 1/133514; G02F 1/133524; G02F 1/133528
  USPC ............................................................ 349/56
  See application file for complete search history.

(56) References Cited

U.S. PATENT DOCUMENTS

2012/0200812 A1\* 8/2012 Qi .......................... B23K 26/38
  349/106

\* cited by examiner

*Primary Examiner* — Nathanael R Briggs
*Assistant Examiner* — William D Peterson

(57) ABSTRACT

A display panel and a terminal device including the same are provided. The display panel includes a touch screen configured to present display content, a supplementary light module that includes a light emitting element configured to provide supplementary light and a light guide element configured to guide the supplementary light to the touch screen, and a display substrate configured to form the display content. The display panel can increase brightness of the touch screen, so that users can see the display content on the display panel clearly even in a dim environment, which improves universality of reflective liquid crystal displays.

16 Claims, 3 Drawing Sheets

DISPLAY PANEL AND TERMINAL DEVICE

The present application claims priority to Chinese Patent Application No. 202110182965.7, titled "DISPLAY PANEL AND TERMINAL DEVICE", filed on Feb. 8, 2021 with the China National Intellectual Property Administration, which is incorporated by reference in the present application in its entirety.

FIELD OF INVENTION

The present disclosure relates to the technical field of display, and particularly to a display panel and a terminal device.

BACKGROUND

With popularization of terminal devices and development of liquid crystal display technology, in order to meet various needs of people in life and work, display panels of terminal devices are becoming more and more diversified. For example, the display panels may be liquid crystal displays (LCDs) or reflective liquid crystal displays (RLCDs). The reflective liquid crystal displays have higher requirements for light intensity of environment. When the reflective liquid crystal displays are in an environment with sufficient sunlight or strong lighting, screens of the reflective liquid crystal displays will be clearer and brighter, which can better satisfy people's viewing experience. When the reflective liquid crystal displays are in an environment where natural light or artificial auxiliary light is darker, the screens of the reflective liquid crystal displays are also darker, and it is difficult for users to comfortably see contents displayed on the screens. Since the reflective liquid crystal displays are highly dependent on ambient light, users must use the terminal devices with the reflective liquid crystal displays according to their environment. If the users are in a dim environment, it is difficult for the users to see the contents displayed on the screens clearly.

SUMMARY OF DISCLOSURE

The present disclosure provides a display panel and a terminal device, which can enable users to see clearly content on the display panel in dim environments and improve universality of reflective liquid crystal displays.

The present disclosure provides a display panel comprising:
- a touch screen configured to present display content;
- a supplementary light module comprising:
  - a light emitting element configured to provide supplementary light; and
  - a light guide element configured to guide the supplementary light to the touch screen; and
- a display substrate configured to form the display content.

In some embodiments, the supplementary light module is disposed between the touch screen and the display substrate, the light guide element is connected to the touch screen, and the light emitting element is connected to the display substrate.

In some embodiments, the display substrate comprises a polarizer, a color filter, and a thin film transistor substrate.

In some embodiments, the display panel further comprises a first adhesive member and a second adhesive member. The first adhesive member is configured to bond the touch screen and the light guide element, and the second adhesive member is configured to bond the light emitting element and the color filter.

In some embodiments, the light emitting element is disposed inside the second adhesive member, and the second adhesive member is further configured to bond the light emitting element and the light guide element.

In some embodiments, the light guide element surrounds four sides of the touch screen, and an outer edge of the light guide element is attached to an edge of the touch screen.

In some embodiments, a width of the light guide element is 2 mm to 3 mm, and the light guide element comprises a transparent polycarbonate (PC) board and/or a transparent polymethyl methacrylate (PMMA) board.

In some embodiments, the light emitting element comprises a plurality of light emitting diode (LED) light bars disposed at four corners of the light guide element.

In some embodiments, the display panel further comprises a brightness controller configured to adjust brightness of the supplementary light.

The present disclosure further provides a terminal device comprising the aforementioned display panel.

The present disclosure provides a display panel and a terminal device comprising the same. A supplementary light module is disposed between a touch screen and a display substrate of the display panel. When the terminal device is working normally, a light emitting element of the supplementary light module provides a supplementary light. The supplementary light is emitted to a light guide element of the supplementary light module. The light guide element guides the supplementary light to the touch screen, thereby increasing brightness of the touch screen. This allows users to see content on the display panel clearly even in a dim environment, which improves universality of reflective liquid crystal displays.

BRIEF DESCRIPTION OF DRAWINGS

In order to more clearly illustrate technical solutions in embodiments of the present disclosure, a brief description of accompanying drawings used in a description of the embodiments will be given below. Obviously, the accompanying drawings in the following description are merely some embodiments of the present disclosure. For those skilled in the art, other drawings may be obtained from these accompanying drawings without creative labor.

DETAILED DESCRIPTION

Figure 1:
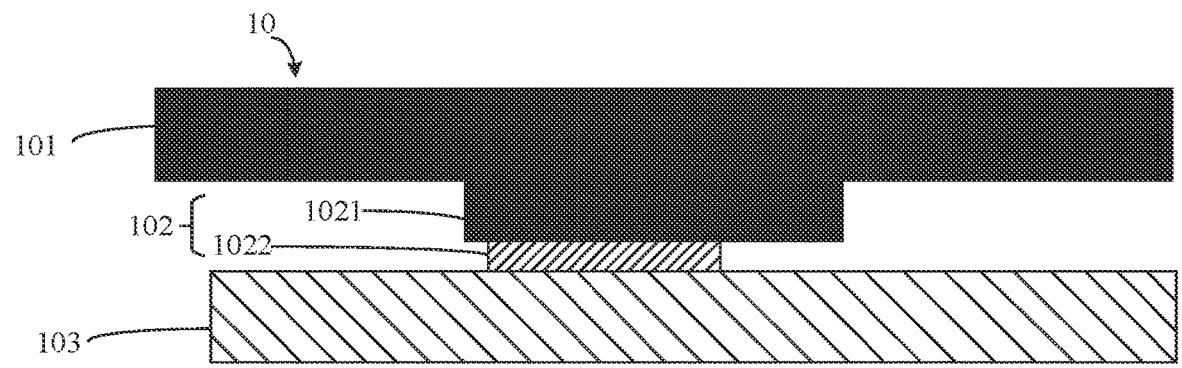
FIG. 1 is a cross-sectional view of a display panel according to an embodiment of the present disclosure.

Technical solutions in embodiments of the present disclosure will be clearly and completely described below in conjunction with accompanying drawings in the embodiments of the present disclosure. It is apparent that the described embodiments are merely a part of the embodiments of the present disclosure and not all embodiments. All other embodiments obtained by those skilled in the art based on the embodiments of the present disclosure without creative labor are within claimed scope of the present disclosure.

In the description of the present disclosure, it should be understood that location or position relationships indicated by terms, such as "inside", "four sides", "edge", "outer edge", "upper", and "lower", are location or position relationships based on illustration of the accompanying drawings, are merely used for describing the present disclosure and simplifying the description instead of indicating or implying the indicated apparatuses or elements should have specified locations or be constructed and operated according to specified locations, and therefore, should not be intercepted as limitations to the present disclosure. Furthermore, terms such as "first" and "second" are used merely for the purpose of description, but shall not be construed as indicating or implying relative importance or implicitly indicating a number of the indicated technical feature. Hence, the feature defined with "first" and "second" may explicitly or implicitly includes one or more of this feature.

In the present disclosure, it should be noted that, unless otherwise explicitly specified or defined, the terms such as "connect" and "bond" should be interpreted in a broad sense. For example, a connection may be a fixed connection, a detachable connection, or an integral connection. A connection may be a mechanical connection, an electrical connection, or a mutual communication. A connection may be a direct connection or may be an indirect connection by using an intermediate medium. A connection may be an internal connection or an interaction between two elements. It may be appreciated by those of ordinary skill in the art that the specific meanings of the aforementioned terms in the present disclosure can be understood depending on specific situations.

The following description provides different embodiments or examples illustrating various structures of the present invention. In order to simplify the description of the present disclosure, only components and settings of specific examples are described below. They are only examples and are not intended to limit the present invention. Furthermore, reference numerals and/or letters may be repeated in different examples of the present disclosure. Such repetitions are for simplicity and clarity, which per se do not indicate relations among the discussed embodiments and/or settings. Furthermore, the present disclosure provides various examples of specific processes and materials, but those skilled in the art can be aware of applications of other processes and/or use of other materials. In the following embodiments, the description of each embodiment has its emphasis. For parts not detailed in one embodiment, reference may be made to the related descriptions in other embodiments.

Please refer to FIG. 1, the present disclosure provides a display panel 10.

The display panel 10 comprises a touch screen 101 configured to present display content, a supplementary light module 102 comprising a plurality of light emitting elements 1022 and a light guide element 1021, and a display substrate 103 configured to form the display content. The light emitting elements 1022 are configured to provide supplementary light, and the light guide element 1021 is configured to guide the supplementary light to the touch screen 101.

In an embodiment, the supplementary light module 102 may be disposed between the touch screen 101 and the display substrate 103, so that the supplementary light module 102 can directly guide the provided supplementary light to the touch screen 101 without having to pass through other layers such as the display substrate 103 of the display panel 10 that will weaken the supplementary light. This maximizes brightness of the touch screen 101 and improves a utilization rate of the supplementary light.

In some embodiments, the light guide element 1021 is an optical element with both reflection and refraction functions. Because the light guide element 1021 needs to guide the supplementary light provided by the light emitting elements 1022 to the touch screen 101, the light guide element 1021 may be connected to the touch screen 101, and the light emitting elements 1022 may be connected to the display substrate 103. This allows the light emitting elements 1022 to emit the supplementary light into the light guide element 1021, and then the light guide element 1021 uses principles of light reflection and refraction to emit the supplementary light toward the touch screen 101.

Figure 2:
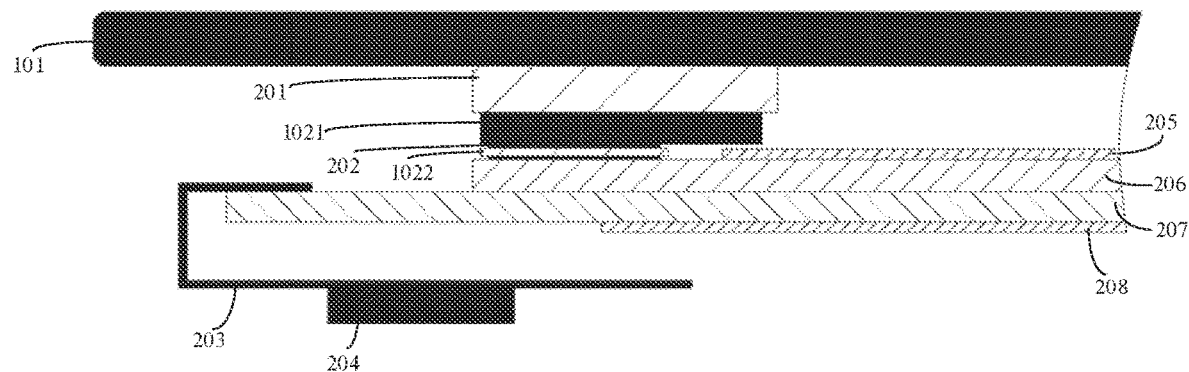
FIG. 2 is another cross-sectional view of the display panel according to the embodiment of the present disclosure.

In this embodiment, please refer to FIG. 2, the display substrate 103 comprises a polarizer, a color filter 206, and a thin film transistor substrate 207. The polarizer comprises an upper polarizer 205 and a lower polarizer 208. Based on a manufacturing process of the display panel 10 and functions of layers of the display substrate 103, the layers of the display substrate 103 from bottom to top is the lower polarizer 208, the thin film transistor substrate 207, the color filter 206, and the upper polarizer 205.

Light vibrating in a specific direction can pass through the polarizer, while light vibrating in other directions cannot pass through the polarizer or has a low pass rate. Therefore, the polarizer controls an amount of light passing through it and makes the display panel 10 images according to deflection of liquid crystals of the display panel 10. The thin film transistor substrate 207 can improve a response speed of the display panel 10, accurately control display color scale, and make color of the display content more realistic. The color filter 206 can provide the three primary colors of red, green, and blue by filtering light, and then mix the three primary colors in different proportions to generate any color, so that the display panel 10 can display color display content.

In one or more embodiments, in order to make various layers of the display panel 10 attach more closely, the display panel 10 may further comprise a plurality of adhesive members, and the various layers of the display panel 10 may be adhered to each other by the adhesive members. The adhesive members may be foam glue or the like.

In some embodiments, please refer to FIG. 2, in order to use the adhesive members to bond different layers of the display panel 10, the adhesive members may comprise a first adhesive member 201 and a second adhesive member 202. The first adhesive member 201 may be disposed between the touch screen 101 and the light guide element 1021, and is configured to bond the touch screen 101 and the light guide element 1021. The second adhesive member 202 may be disposed between the light emitting elements 1022 and the color filter 206, and is configured to bond the light emitting elements 1022 and the color filter 206.

In this embodiment, in order to bond the light emitting elements 1022 and the light guide element 1021, it is necessary to dispose an adhesive member between the light emitting elements 1022 and the light guide element 1021. The light emitting elements 1022 are thinner. In order to reduce a number of adhesive members and a number of layers included in the display panel 10, the light emitting elements 1022 may be disposed inside the second adhesive member 202, as shown in FIG. 2. This makes the light emitting elements 1022 sticky in all directions, and any surface of the light emitting elements 1022 can be used to bond with other layers.

Accordingly, the second adhesive member 202 may be further configured to bond the light emitting elements 1022 and the light guide element 1021. Because the second adhesive member 202 may have conductive and light-transmitting properties, the second adhesive member 202 will not weaken the supplementary light provided by the light emitting elements 1022, nor will it affect a conductive property of each of the layers of the display panel 10.

In some embodiments, in order to make connection between the light emitting elements 1022 and the light guide element 1021 closer, a third adhesive member may be disposed between the light emitting elements 1022 and the light guide element 1021.

Figure 3:
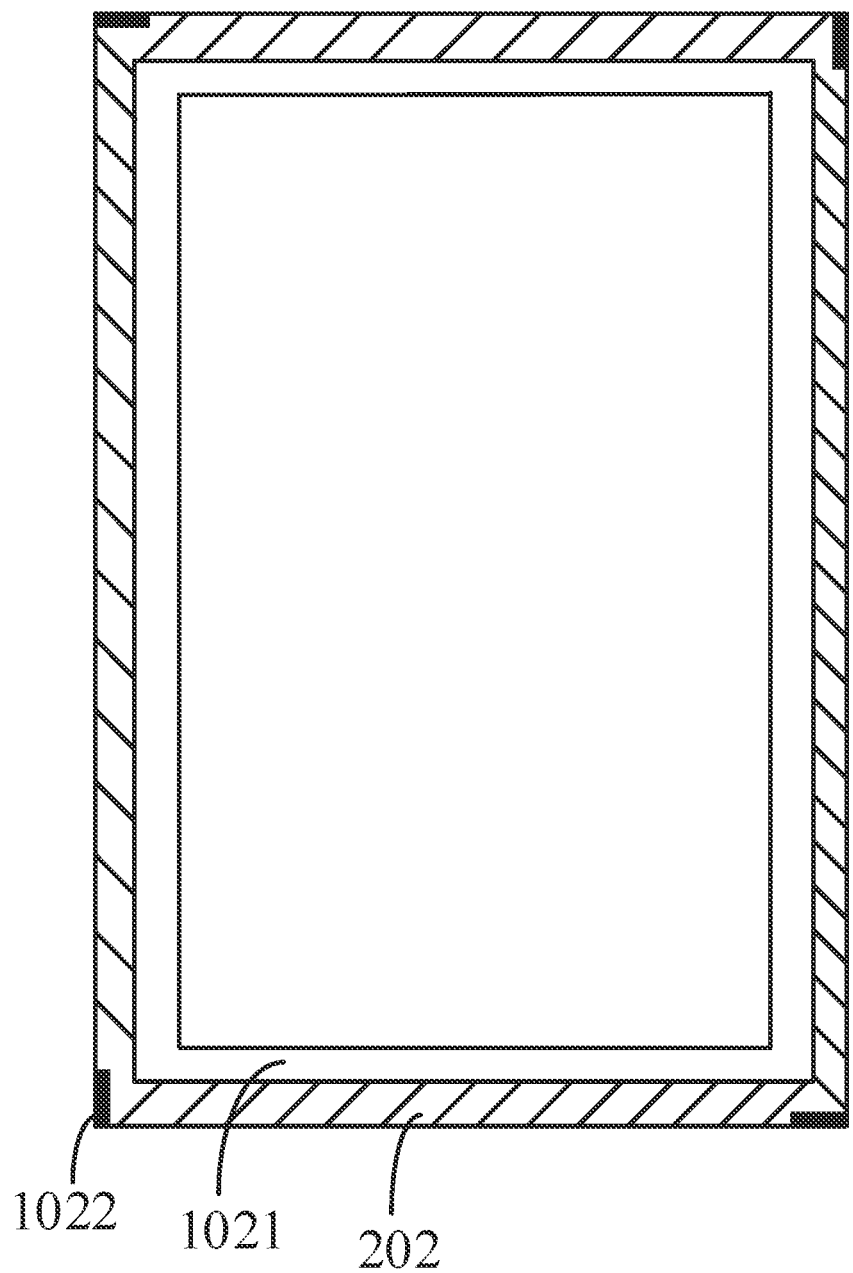
FIG. 3 is a schematic structural diagram of a supplementary light module and a second adhesive member according to an embodiment of the present disclosure.

In an embodiment, please refer to FIG. 3, the light guide element 1021 may be arranged to surround four sides of the touch screen 101, so that the light guide element 1021 can guide the supplementary light to the touch screen 101 in various directions to avoid a situation that some areas of the touch screen 101 are brighter and some areas of the touch screen 101 are darker. An outer edge of the light guide element 1021 may be attached an edge of the touch screen 101, so that the light guide element 1021 can inject the supplementary light from the edge to a middle of the touch screen 101 to avoid uneven brightness at the edge and the middle of the touch screen 101. Therefore, brightness of each area of the touch screen 101 viewed by users is consistent, and the users can see complete display content. It does not happen that part of the display content cannot be seen clearly because of low brightness.

In some embodiments, in order to avoid loss of a part of the supplementary light due to transmission in the light guide element 1021, a width of the light guide element 1021 may be set to a preset threshold. For example, the preset threshold may be 2 mm to 3 mm. In addition, after the supplementary light provided by the light emitting elements 1022 enters the light guide element 1021, in order to facilitate the supplementary light to be reflected and/or refracted in the light guide element 1021, the light guide element 1021 may be set to be transparent. This can also prevent color of the light guide element 1021 from interfering with color of the supplementary light, so that the color of the supplementary light guided by the light guide element 1021 to the touch screen 101 does not change, thereby not affecting color of the display content on the touch screen 101. The light guide element 1021 may comprise a transparent polycarbonate (PC) board and/or a transparent polymethyl methacrylate (PMMA) board. The PC board, also known as polycarbonate board, polyester board, or Capron board, has characteristics of good light transmission, high transparency, light weight, impact resistance, sound insulation, heat insulation, flame retardancy, and/or anti-aging. PMMA board, also known as an acrylic board, has characteristics of good light transmission and high brightness.

In this embodiment, please refer to FIG. 3, the light emitting elements 1022 may be disposed at four corners of the light guide element 1021. The supplementary light emitted by the light emitting elements 1022 is transmitted in the light guide element 1021. According to the principle of light refraction and the principle of light reflection, the supplementary light may be refracted from the light guide element 1021 into the touch screen 101 in various directions to supplement the brightness of the touch screen 101. Directions in which the light emitting elements 1022 are disposed in the light guide element 1021 may be different or same, and may be flexibly set according to actual conditions. The light emitting elements 1022 may be light emitting diode (LED) light bars.

In some embodiments, please refer to FIG. 3, areas of the light emitting elements 1022 are small. In order to make the light guide element 1021 more closely adhere to the light emitting elements 1022 and other layers in the display panel 10, the second adhesive member 202 may be arranged to surround four sides of the light guide element 1021. This not only makes the light emitting elements 1022 adhere to the light guide element 1021, but also to the color filter 206 of the display panel 10, thereby preventing the light guide element 1021 from being separated from the display substrate 103 of the display panel 10 due to not closely adhering the light emitting elements 1022.

In an embodiment, in order to reduce an amount of the second adhesive member 202, the second adhesive member 202 may be disposed only on a contact area between the light emitting elements 1022 and the light guide element 1021. This makes the light emitting elements 1022 and the light guide element 1021 adhere to each other and reduces production cost.

In an embodiment, the display panel 10 is a reflective liquid crystal display panel. If the display panel 10 is placed in an environment with sufficient sunlight or strong lighting, the touch screen 101 of the display panel 10 will be brighter. If the display panel 10 is placed in an environment where natural light or artificial auxiliary light is darker, the touch screen 101 of the display panel 10 will be darker. Because the light emitting element 1022 is always on when the touch screen 101 is in normal use, the supplementary light module 102 will continue to supplement the touch screen 101 with light to add additional brightness to original brightness of the touch screen 101. In order to avoid high brightness of the touch screen 101 affecting user's viewing comfort, the display panel 10 may comprise a brightness controller configured to adjust brightness of the supplementary light, so that the brightness of the touch screen 101 is more suitable for the user's needs.

In some embodiments, users can perform related operations on the brightness controller according to their own needs. When the display panel 10 is in a darker environment, the brightness controller is adjusted to increase the brightness of the supplementary light. When the display panel 10 is in a brighter environment, the brightness controller is adjusted to reduce the brightness of the supplementary light. In order to facilitate user's operation, the brightness controller may be set to automatically adjust the brightness of the supplementary light according to brightness of an environment where the display panel 10 is located, so that the brightness of the touch screen 101 can match user's reading requirements in real time.

In one or more embodiments, please refer to FIG. 2, the display panel 10 may further comprise a flexible printed circuit (FPC) 203 and a driving circuit device 204. The FPC 203 is configured to transmit electrical signals to make components of the display panel 10 operate normally. The driving circuit device 204 is configured to drive circuits included in the display panel 10.

In the present invention having the above structure, the supplementary light module 102 is disposed between the touch screen 101 and the display substrate 103 of the display panel 10. When a terminal device is working normally, the light emitting element 1022 of the supplementary light module 102 provides a supplementary light. The supplementary light is emitted to the light guide element 1021 of the supplementary light module 102. The light guide element 1021 guides the supplementary light to the touch screen 101, thereby increasing the brightness of the touch screen 101. This allows users to see content on the display panel 10 clearly even in a dim environment, which improves universality of reflective liquid crystal displays.

Figure 4:
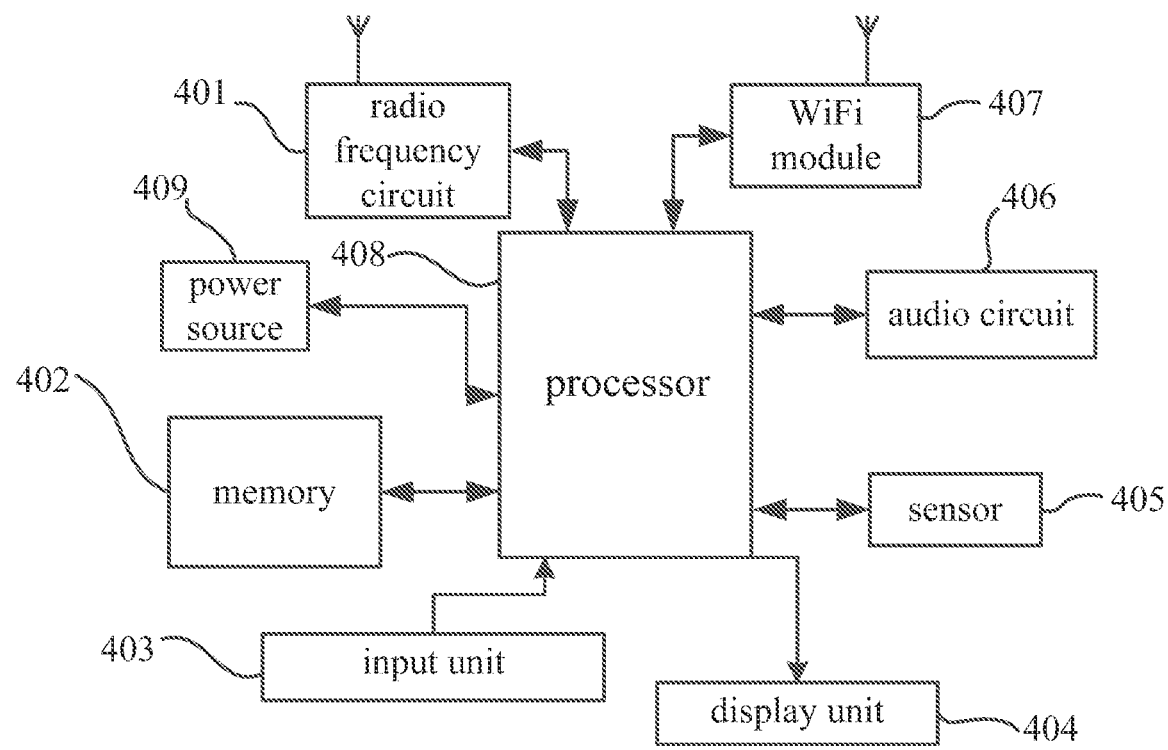
FIG. 4 is a schematic structural diagram of a terminal device according to an embodiment of the present disclosure.

The present disclosure further provides a terminal device. As shown in FIG. 4, the terminal device may comprise a radio frequency (RF) circuit 401, a memory 402 having one or more computer-readable storage media, an input unit 403, a display unit 404, a sensor 405, an audio circuit 406, a wireless fidelity (WiFi) module 407, a processor 408 having one or more processing core, power source 409, and other components. Those skilled in the art can understand that the terminal device shown in FIG. 4 does not constitute a limitation on the terminal device, and the terminal device may comprise more or fewer components than shown in the figure, or may combine some components, or may have a different arrangement of components.

The RF circuit 401 may be configured to receive and send signals during information transmission or communication. In particular, the RF circuit 401 receives downlink information of a base station, and then sends it to the processor 408 for processing. In addition, the RF circuit 401 sends data related to uplink to the base station. Generally, the RF circuit 401 comprises, but is not limited to, an antenna, one or more amplifiers, a tuner, one or more oscillators, a subscriber identity module (SIM) card, a transceiver, a coupler, a low noise amplifier (LNA), a duplexer, etc. In addition, the RF circuit 401 may also communicate with a network and other devices through wireless communication. The wireless communication may use any communication standard or protocol, comprising but not limited to global system of mobile communication (GSM), general packet radio service (GPRS), code division multiple access (CDMA), wideband code division multiple access (WCDMA), long term evolution (LTE), E-mail, short messaging service (SMS), etc.

The memory 402 may be configured to store software programs and modules. The processor 408 executes various functional applications and data processing by running the software programs and the modules stored in the memory 402. The memory 402 may mainly comprise a program storage region and a data storage region. The program storage region may store an operating system, one or more application programs required by functions (such as a sound playing function, an image playing function, etc.), and the like. The data storage region may store data (such as audio data, telephone book, etc.) created according to use of the terminal device, and the like. In addition, the memory 402 may comprise a high-speed random access memory, and may further comprise non-volatile memories, such as one or more disk memory devices and flash memory devices, or other volatile solid storage devices.

The input unit 403 may be configured to receive inputted digit or character information, and generate a keyboard, mouse, joystick, optical, or trackball signal input related to user settings and function control. Specifically, in a specific embodiment, the input unit 403 may comprise a touch-sensitive surface and other input devices. The touch-sensitive surface, also called a touch screen or a touchpad, may collect user's touch operations on or near it (for example, user's operations on or near the touch-sensitive surface with fingers, stylus, or any other suitable objects or accessories) and drive a corresponding connection apparatus according to a preset program. Optionally, the touch-sensitive surface may comprise two parts: a touch detection device and a touch controller. The touch detection device detects user's touch positions, detects a signal generated by the touch operation, and transmits the signal to the touch controller. The touch controller receives touch information from the touch detection apparatus, converts the touch information into contact coordinates, and then sends the contact coordinates to the processor 408, and can receive and execute commands sent by the processor 408. In addition, the touch-sensitive surface may be implemented in various types such as resistive, capacitive, infrared, and surface acoustic wave types. In addition to the touch-sensitive surface, the input unit 403 may also comprise other input devices. Specifically, other input devices may comprise, but are not limited to, one or more of a physical keyboard, function keys (such as volume control keys, switch keys, etc.), a trackball, a mouse, and a joystick.

The display unit 404 may be configured to display information inputted by users or information provided to the users, and various graphical user interfaces of the terminal device. The graphical user interfaces may be composed of graphics, text, icons, videos, and any combination thereof. The display unit 404 may comprise the aforementioned display panel. Optionally, the display panel may be configured in a form of a liquid crystal display (LCD), an organic light-emitting diode (OLED), or the like. Further, the touch-sensitive surface may cover the display panel. When the touch-sensitive surface detects a touch operation thereon or nearby, the touch-sensitive surface transmits the touch operation to the processor 408 to determine a type of the touch operation. Subsequently, the processor 408 provides corresponding visual output on the display panel according to the type of the touch operation. In FIG. 4, the touch-sensitive surface and the display panel are implemented as two separated components to realize input and output functions. However, in some embodiments, the touch-sensitive surface may be integrated with the display panel to realize the input and output functions.

The terminal device may further comprise one or more sensors 405 such as a light sensor, a motion sensor, and other sensors. Specifically, the light sensor may comprise an ambient light sensor and a proximity sensor. The ambient light sensor can adjust brightness of the display panel according to brightness of ambient light. The proximity sensor can turn off the display panel and/or backlight when the terminal device is moved to an ear. As a kind of motion sensor, a gravity acceleration sensor can detect magnitude of acceleration in various directions (usually three axes), may detect magnitude and direction of gravity when it is stationary, and may be configured to identify applications of postures of the terminal device (such as horizontal and vertical screen switching, related games, and magnetometer posture calibration), vibration recognition related functions (such as pedometer and tap), etc. As for other sensors such as gyroscopes, barometers, hygrometers, thermometers, and infrared sensors, which may be configured in the terminal device, they will not be elaborated herein.

The audio circuit 406, a speaker, and a microphone can provide an audio interface between users and the terminal device. The audio circuit 406 can receive an electric signal converted from audio data and transmit it to the speaker. The speaker converts the electrical signal into an audio signal and outputs it. On the other hand, the microphone collects a sound signal and converts it into an electric signal. The audio circuit 406 receives the electric signal, converts it into audio data. After the audio data is outputted to the processor 408 for processing, the audio data is sent to another terminal device via the RF circuit 401, or the audio data is outputted to the memory 402 for further processing. The audio circuit 406 may further comprise an earplug jack to provide communication between a peripheral earphone and the terminal device.

WiFi is a short-range wireless transmission technology. The terminal device can help users to send and receive E-mails, browse web pages, and access streaming media via the WiFi module 407. The WiFi module 407 provides users with wireless broadband internet access. Although FIG. 4 shows the WiFi module 407, it can be understood that the WiFi module 407 is not s necessary component of the terminal device and may be omitted as needed without changing the essence of the present invention.

The processor 408 is a control center of the terminal device, and uses various interfaces and lines to connect various parts of the terminal device. The processor 408 runs or executes the software programs and/or the modules stored in the memory 402, and calls data stored in the memory 402 to perform various functions of the terminal device and process data, thereby monitoring the entire terminal device. Optionally, the processor 408 may comprise one or more processing cores. Preferably, the processor 408 may integrate an application processor and a modem processor. The application processor mainly processes an operating system, a user interface, an application program, and the like. The modem processor mainly processes wireless communications. It can be understood that the modem processor may not be integrated into the processor 408.

The terminal device further comprises the power source 409 (such as a battery) for powering the components. Preferably, the power source 409 may be logically connected to the processor 408 via a power management system, thereby implementing functions such as charging, discharging, and power consumption management via the power management system. The power source 409 may comprise one or more of a direct current or cross current power source, a recharging system, a power failure detection circuit, a power converter or inverter, and a power status indicator.

Although not shown, the terminal device may further comprise a camera, a Bluetooth module, a display panel, etc., which will not be elaborated herein. Specifically, in this embodiment, the display panel in the terminal device comprises a touch screen, a supplementary light module, and a display substrate. The touch screen is configured to present display content. The supplementary light module comprises a light emitting element and a light guide element. The light emitting element is configured to provide supplementary light. The light guide element is configured to guide the supplementary light to the touch screen. The display substrate is configured to form the display content.

Accordingly, in the terminal device provided by this embodiment, the supplementary light module is disposed between the touch screen and the display substrate of the display panel. When the terminal device is working normally, the light emitting element of the supplementary light module provides the supplementary light. The supplementary light is emitted to the light guide element of the supplementary light module. The light guide element guides the supplementary light to the touch screen, thereby increasing brightness of the touch screen. This allows users to see content on the display panel clearly even in a dim environment, which improves universality of reflective liquid crystal displays.

In the above embodiments, the description of each embodiment has its own emphasis. For parts not detailed in one embodiment, reference may be made to the related descriptions in other embodiments.

The display panel and the terminal device provided by the embodiments of the present disclosure are described in detail above. The present disclosure uses specific examples to describe principles and embodiments of the present application. The above description of the embodiments is only for helping to understand the technical solutions of the present disclosure and its core ideas. It should be understood by those skilled in the art that they can modify the technical solutions recited in the foregoing embodiments, or replace some of technical features in the foregoing embodiments with equivalents. These modifications or replacements do not cause essence of corresponding technical solutions to depart from the scope of the technical solutions of the embodiments of the present disclosure.

What is claimed is:

1. A display panel, comprising:
a touch screen configured to present display content;
a supplementary light module comprising:
a light emitting element configured to provide supplementary light; and
a light guide element configured to guide the supplementary light to the touch screen; and
a display substrate configured to form the display content;
wherein the supplementary light module is disposed between the touch screen and the display substrate, the light guide element is connected to the touch screen, and the light emitting element is connected to the display substrate.

2. The display panel according to claim 1, wherein the display substrate comprises a polarizer, a color filter, and a thin film transistor substrate.

3. The display panel according to claim 2, further comprising:
a first adhesive member configured to bond the touch screen and the light guide element; and
a second adhesive member configured to bond the light emitting element and the color filter.

4. The display panel according to claim 3, wherein the light emitting element is disposed inside the second adhesive member, and the second adhesive member is further configured to bond the light emitting element and the light guide element.

5. The display panel according to claim 1, wherein the light guide element surrounds four sides of the touch screen, and an outer edge of the light guide element is attached to an edge of the touch screen.

6. The display panel according to claim 5, wherein a width of the light guide element is 2 mm to 3 mm, and the light guide element comprises a transparent polycarbonate (PC) board or a transparent polymethyl methacrylate (PMMA) board.

7. The display panel according to claim 5, wherein the light emitting element comprises a plurality of light emitting diode (LED) light bars disposed at four corners of the light guide element.

8. The display panel according to claim 1, further comprising a brightness controller configured to adjust brightness of the supplementary light.

9. A terminal device, comprising a display panel, wherein the display panel comprises:
a touch screen configured to present display content;
a supplementary light module comprising:
a light emitting element configured to provide supplementary light; and
a light guide element configured to guide the supplementary light to the touch screen; and a display substrate configured to form the display content; and wherein the supplementary light module is disposed between the touch screen and the display substrate, the light guide element is connected to the touch screen, and the light emitting element is connected to the display substrate.

10. The terminal device according to claim 9, wherein the display substrate comprises a polarizer, a color filter, and a thin film transistor substrate.

11. The terminal device according to claim 10, wherein the display panel further comprises:

a first adhesive member configured to bond the touch screen and the light guide element; and a second adhesive member configured to bond the light emitting element and the color filter.

12. The terminal device according to claim 11, wherein the light emitting element is disposed inside the second adhesive member, and the second adhesive member is further configured to bond the light emitting element and the light guide element.

13. The terminal device according to claim 9, wherein the light guide element surrounds four sides of the touch screen, and an outer edge of the light guide element is attached to an edge of the touch screen.

14. The terminal device according to claim 13, wherein a width of the light guide element is 2 mm to 3 mm, and the light guide element comprises a transparent polycarbonate (PC) board or a transparent polymethyl methacrylate (PMMA) board.

15. The terminal device according to claim 13, wherein the light emitting element comprises a plurality of light emitting diode (LED) light bars disposed at four corners of the light guide element.

16. The terminal device according to claim 9, wherein the display panel further comprises a brightness controller configured to adjust brightness of the supplementary light.

* * * * *